United States Patent [19]

Tuttle

[11] Patent Number: 5,787,174
[45] Date of Patent: Jul. 28, 1998

[54] REMOTE IDENTIFICATION OF INTEGRATED CIRCUIT

[75] Inventor: John R. Tuttle, Boise, Id.

[73] Assignee: Micron Technology, Inc., Boise, Id.

[21] Appl. No.: 556,818

[22] Filed: Nov. 2, 1995

Related U.S. Application Data

[63] Continuation-in-part of Ser. No. 489,185, Jun. 9, 1995, abandoned, which is a continuation-in-part of Ser. No. 899,777, Jun. 17, 1992, abandoned, and a continuation-in-part of Ser. No. 168,909, Dec. 17, 1993, Pat. No. 5,497,140, and a continuation-in-part of Ser. No. 422,007, Apr. 11, 1995, Pat. No. 5,572,226, and a continuation-in-part of Ser. No. 990,915, Dec. 15, 1992, Pat. No. 5,550,650, and a continuation-in-part of Ser. No. 263,210, Jun. 21, 1994, Pat. No. 5,583,850, which is a continuation of Ser. No. 990,918, Dec. 15, 1992, Pat. No. 5,365,551.

[51] Int. Cl.$^6$ .................................................. H04L 9/32
[52] U.S. Cl. ...................... 380/23; 324/764; 342/44; 438/19
[58] Field of Search ........................ 380/4, 23, 25; 438/19; 324/764; 342/42, 44

[56] References Cited

U.S. PATENT DOCUMENTS

| | | | |
|---|---|---|---|
| 4,075,632 | 2/1978 | Baldwin et al. | 343/6.8 R |
| 4,827,395 | 5/1989 | Anders et al. | 342/44 |
| 4,857,893 | 8/1989 | Carroll | 340/572 |
| 4,862,160 | 8/1989 | Ekchian et al. | 340/825.54 |
| 5,030,807 | 7/1991 | Landt et al. | 235/375 |
| 5,055,659 | 10/1991 | Hendrick et al. | 235/439 |
| 5,103,166 | 4/1992 | Jeon et al. | 324/764 |
| 5,153,710 | 10/1992 | McCain | 357/75 |
| 5,196,374 | 3/1993 | Hundt et al. | 438/19 |
| 5,218,343 | 6/1993 | Stobbe et al. | 340/572 |
| 5,302,954 | 4/1994 | Brooks | 342/44 |
| 5,448,110 | 9/1995 | Tuttle et al. | 257/723 |
| 5,469,363 | 11/1995 | Saliga | 364/478 |
| 5,530,753 | 6/1996 | Easter et al. | 380/4 |

OTHER PUBLICATIONS

Crabtree, R.P., "Software serial number", IBM Technical Disclosure Bulletin, vol. 26, No. 7B, pp. 3918–3919 (Dec. 1983).

Shamir, Adi, "Identity–based cryptosystems and signature schemes", Advances in Cryptology:Proc. Crypto 84, pp. 47–53 (1984).

Hwang, T. et al., "Non–interactive password authentications without password tables", Proc. IEEE Tencon 90, vol. 1, pp. 429–431 (Sep. 1990).

Chang, C–C et al., "Remote password authentication with smart cards", IEE Proc.–E, vol. 138, No. 3, pp. 165–167 (May 1991).

Primary Examiner—Gilberto Barrón, Jr.
Attorney, Agent, or Firm—Robert J. Stern

[57] ABSTRACT

Circuitry mounted within a single hybrid or monolithic integrated circuit (I.C.) package including: (1) a first integrated circuit which is desired to be tracked for some purpose such as security or inventory, and (2) a second circuit having a memory for storing an identification number and an RF transceiver for transmitting the stored number in response to an RF interrogation signal. For security purposes, the invention makes it difficult or impossible for a thief to alter the identification number without destroying the I.C., because the identification number is stored in memory within the I.C. For inventory purposes, the invention overcomes the need to affix an external identification tag to the I.C. package. The invention is especially suited for protecting a highly valuable first integrated circuit such as a microprocessor.

24 Claims, 2 Drawing Sheets

REMOTE IDENTIFICATION OF INTEGRATED CIRCUIT

CROSS REFERENCE TO RELATED APPLICATIONS

This patent application is a continuation-in-part of each of the following U.S. patent applications: (1) application Ser. No. 08/489,185 filed Jun. 9, 1995 abandoned entitled "Enclosed Transceiver", which is a continuation-in-part of application Ser. No. 07/899,777 filed Jun. 17, 1992 abandoned (2) application Ser. No. 08/168,909 filed Dec. 17, 1993 U.S. Pat. No. 5,497,140 entitled "Electrically Powered Postage Stamp or Mailing or Shipping Label Operative with RF Communications"; (3) application Ser. No. 08/422,007 filed Apr. 11, 1995 U.S. Pat. No. 5,572,226, entitled "Spherical Antenna Pattern(s) From Antennas Arranged in a Two-Dimensional Plane for Use in RFID Tags and Labels"; (4) application Ser. No. 07/990,915 filed Dec. 15, 1992 U.S. Pat. No. 5,550,650 entitled "Data Communication Method Using Identification Protocol"; and (5) application Ser. No. 08/263,210 filed Jun. 21, 1994 U.S. Pat. No. 5,583,850 entitled "Data Communication System Using Identification Protocol", which is a continuation of application Ser. No. 07/990,918 filed Dec. 15, 1992 U.S. Pat. No. 5,365,551.

FIELD OF THE INVENTION

The invention relates to methods and apparatus for encoding an integrated circuit with a serial number or other identifying number for tracking the integrated circuit. More specifically, the invention relates to methods and apparatus for remotely reading the identifying number of an integrated circuit by radio frequency communication.

BACKGROUND OF THE INVENTION

Theft of integrated circuits (I.C.'s) is a significant problem for semiconductor manufacturers and distributors because a single integrated circuit only one to three square inches in size can be worth several hundred dollars.

One obstacle to law enforcement or security personnel seeking to find and recover stolen integrated circuits is the ease of concealing I.C.'s because of their small size. There is a need for some means for locating stolen integrated circuits even if they are concealed.

Another obstacle to law enforcement personnel is the difficulty of identifying I.C.'s recovered from a suspected thief to verify that they were stolen. Although one possible solution would be to inscribe identification numbers on the outside of I.C. packages, thieves could deface or remove the numbers.

A rather different problem for semiconductor manufacturers and distributors is monitoring their inventory of integrated circuits. Bar code labels conventionally used to track larger inventory items have not found wide acceptance for labelling integrated circuits, largely because most integrated circuit packages are too small to accommodate a conventional bar code label.

SUMMARY OF THE INVENTION

The present invention is useful both for tracking inventories of integrated circuits and for locating and identifying stolen integrated circuits.

In the present invention, a conventional integrated circuit package encloses: (1) a first, conventional integrated circuit which is desired to be identified and tracked; (2) a memory circuit in which a serial number or other number is stored which identifies the integrated circuit; and (3) a radio frequency (RF) transceiver circuit which transmits a message conveying the stored number in response to a predetermined RF interrogation signal.

Because the invention stores the identifying number in a memory circuit within the integrated circuit package, it would be difficult or impossible for a thief to change or erase the identifying number without destroying the integrated circuit and rendering it worthless. For tracking the integrated circuit in inventory, the invention overcomes the need to affix an external identification tag to the I.C. package.

Because the invention transmits its identifying number in response to RF interrogation, law enforcement or security personnel can use an RF interrogator transceiver to detect concealed, stolen integrated circuits. For inventory tracking, the invention permits a large number of integrated circuit inventory items to be tracked by a remotely located interrogator transceiver. In contrast, conventional inventory tags require the tag to be held very close to a scanner such as a bar code reader for individual scanning of each inventory item.

The memory which stores the identification number can be either volatile or non-volatile. In embodiments using volatile memory, preferably a battery for maintaining the memory is mounted in or on the integrated circuit package. Most preferably, the battery is mounted in such a way that the battery cannot be disconnected without physically defacing or destroying the package, thereby destroying the resale value of the I.C.

In embodiments using non-volatile memory, the RF transceiver included in the I.C. package preferably is designed to operate without battery power. For example, the RF transceiver can be a passive RF transponder which responds to a received RF interrogation signal by modulating the received signal and reflecting it back toward the interrogator. Alternatively, the transceiver can rectify received RF signals to supply power to active devices such as transistors within the transceiver circuit.

The invention is applicable to both hybrid and monolithic integrated circuits. The transceiver and memory circuits can be implemented on a monolithic integrated circuit substrate distinct from the substrate or substrates on which the first integrated circuit is fabricated. All the substrates can be enclosed in a single integrated circuit package, so that the inclusion of the extra circuitry of the invention need not be visually apparent. Preferably, the first integrated circuit, the memory circuit, and the RF transceiver circuit all can be fabricated on a single, monolithic, integrated circuit substrate.

DETAILED DESCRIPTION OF THE PREFERRED EMBODIMENTS

1. Overview of Physical Package

Figure 1:
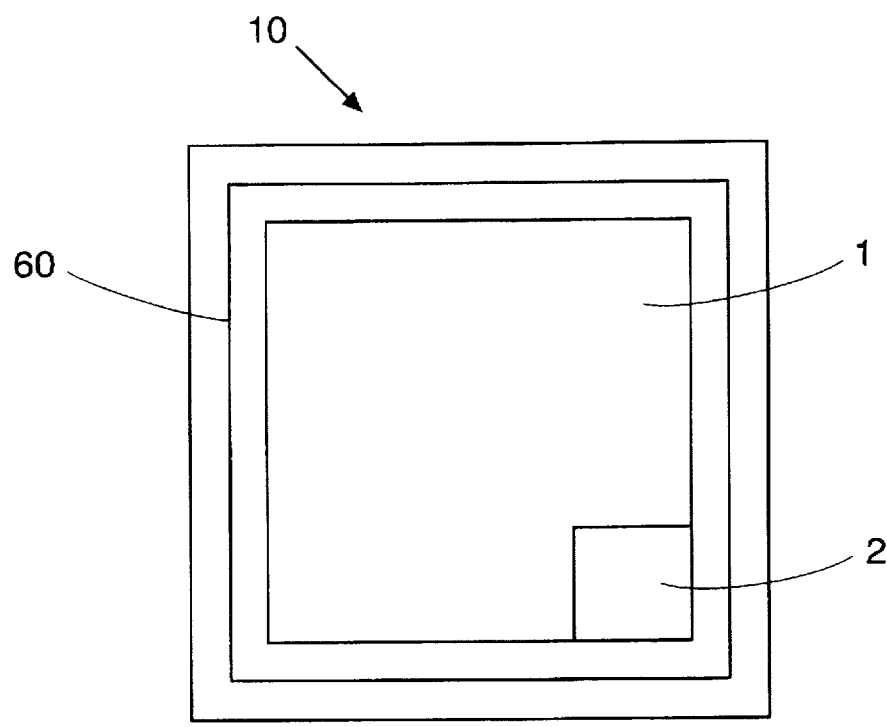
FIG. 1 is a plan view of a monolithic integrated circuit die including the present invention.

FIG. 1 illustrates a first embodiment of the invention in a monolithic integrated circuit (I.C.) die 10. Most of the surface area on the die is occupied by a first circuit 1, which may be any conventional, valuable circuit which is to be identified by use of the invention. For example, first circuit 1 may be a microprocessor worth several hundred dollars. A much smaller surface area on the die is occupied by a second circuit 2 which implements the present invention.

In the remainder of this description, the first circuit 1 will be called the "main" circuit, because it is the circuit which performs the primary function which makes the I.C. useful. The second circuit 2 will be called the "ID" circuit, because it stores and transmits the identifying number (the "ID" number) of the I.C. 10.

Figure 2:
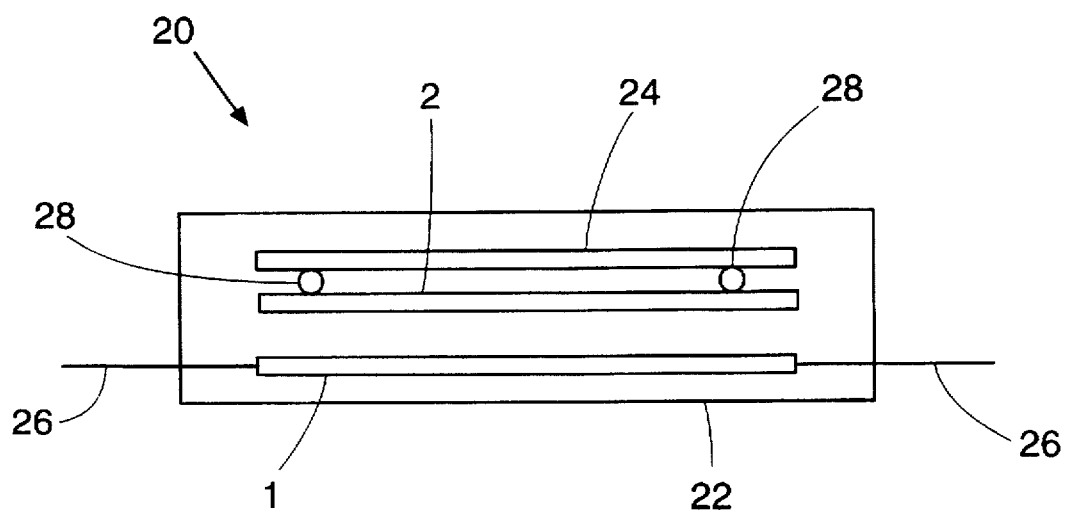
FIG. 2 is a side sectional view of a hybrid integrated circuit including the invention.

FIG. 2 illustrates a second embodiment of the invention in a hybrid integrated circuit (I.C.) 20. A conventional hybrid circuit package 22 encloses first and second monolithic integrated circuit dice 1 and 2, respectively, and an optional battery 24. The first I.C. die 1 contains the above-mentioned conventional "main" circuit, and the second I.C. die 2 contains the ID circuit of the invention. The main circuit 1 can be connected to conventional leads or pins 26 for connection to other circuitry, such as a printed wiring board. The ID circuit 2 is connected to the battery 24 by conductive pads 28, but need not be connected to the first circuit or any external circuitry.

Figure 3:
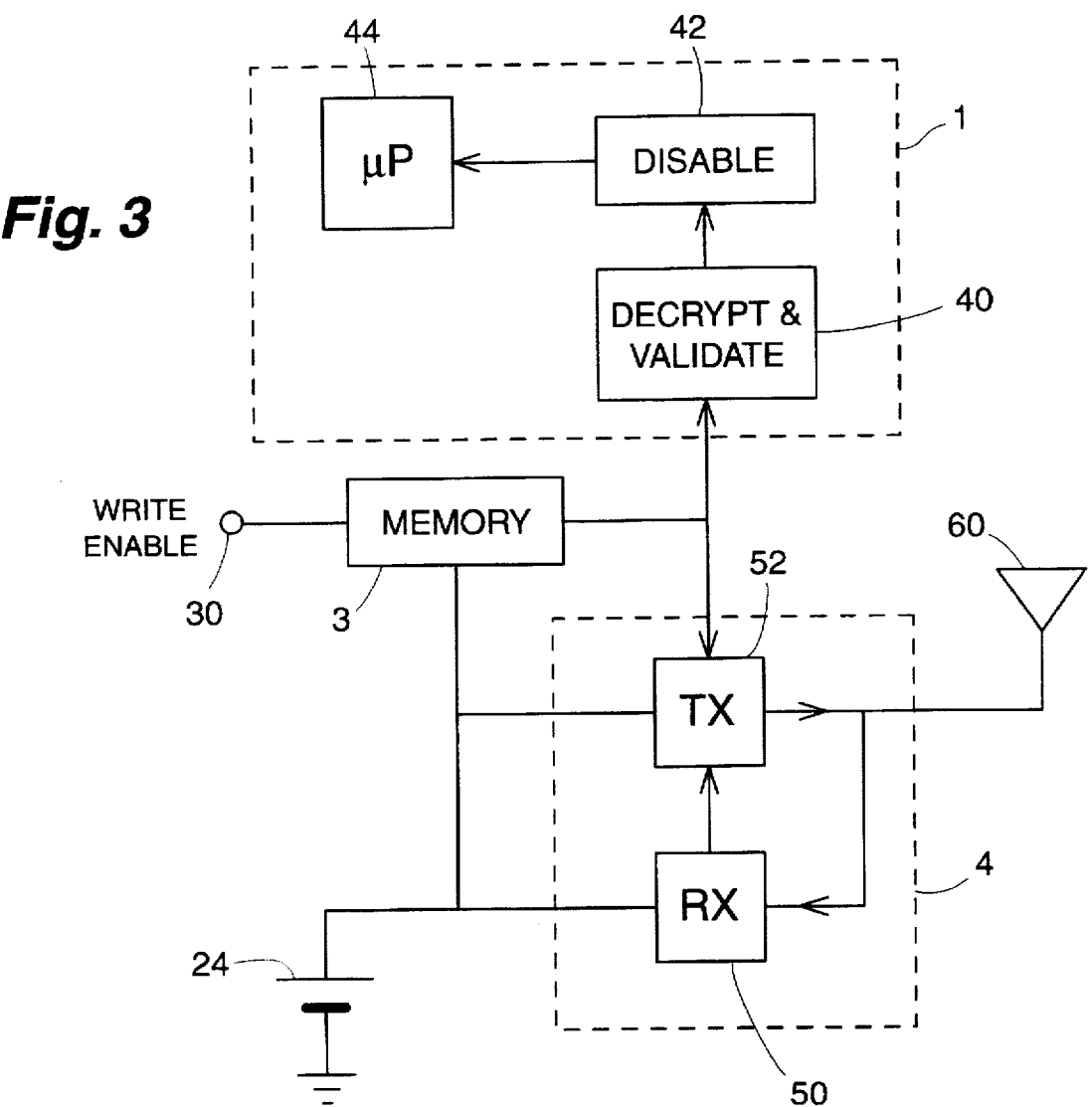
FIG. 3 is an electrical block diagram of an integrated circuit including the invention.

As shown in FIG. 3, the ID circuit 2 includes an ID number memory circuit 3 and an RF transceiver circuit 4.

2. Memory

The ID number memory 3 preferably is configured during manufacture of the integrated circuit 10 or 20 so as to store a number which identifies the I.C. 10 or 20. For example, the identifying number can be a customer number, model number, or production batch number. More preferably, however, the identifying number is a serial number which uniquely identifies each integrated circuit 10 or 20 so that no two I.C.'s have the same serial number. Preferably, the memory 3 can store a number having enough bits to allow a unique serial number to be assigned to every integrated circuit 10 or 20 incorporating the invention which is expected to be manufactured for many years.

The memory 3 which stores the identification number of the I.C. 10 or 20 can be either non-volatile memory or volatile memory.

Non-volatile memory can be either permanent or re-writable. Examples of permanent memory are conventional ROM (read-only memory) and PROM (programmable read-only memory). Examples of re-writable memory are conventional EPROM (electrically programmable read-only memory) and EEPROM (electrically erasable programmable read-only memory).

Permanent memory has the advantage of preventing thieves from altering the stored identification number. However, it has the disadvantage of storing the identification number by the physical locations of transistors or conductors, which thieves possibly could examine with an optical or electron microscope to read the identification number.

Conversely, re-writable memory has the advantage that the stored identification number cannot be detected with a microscope. However, it has the disadvantage of possibly being re-writable by a thief.

Re-writable memory generally has a write enable input 30 which controls whether the data stored in the memory can be re-written with a specified new value. In the present invention, the re-writable memory 3 preferably is protected from alteration by a thief by manufacturing the memory circuit 3 so that the write enable input is not connected to any contact external to the dielectric package 22 which encloses the memory circuit 3. The identification number is stored in the memory 3 before the I.C. is mounted in its package 22, during which time a conventional wafer probe can be used to provide signals to the write enable input. After the identification number is stored in the memory 3, the I.C. is encapsulated in a package 22, thereby protecting the memory from being re-written.

Suitable designs for non-volatile memory 3, and suitable methods for storing in the memory a unique serial number for each I.C. die 10 or I.C. hybrid package 20 as it is manufactured, are commonly used in making conventional Ethernet local area network transceivers. Such transceivers include a non-volatile memory which stores a unique Ethernet physical device address.

Alternatively, ID memory circuit 3 can be a volatile memory such as conventional SRAM (static random access memory) or DRAM (dynamic random access memory). Volatile memory always is re-writable, hence it has the same advantages and disadvantages described above for re-writable non-volatile memory. Volatile memory has the additional disadvantage of requiring continuous connection to an electrical power source in order to preserve the identification number stored in the memory 3. If the electrical power is disconnected or interrupted, the identification number will be lost.

Accordingly, if volatile memory is used for ID memory circuit 3, a battery 24 preferably is permanently connected to the memory 3. Also, the battery preferably is encapsulated within the I.C. package so that a thief cannot disconnect the battery from the I.C. without damaging the main circuit 1.

3. Validating or Encrypting Identification Number

As described above, the I.C. 10 or 20 preferably is packaged so that the ID memory circuit 3 cannot be accessed by a thief to alter or erase the identification number stored therein without damaging the I.C. As an additional or alternative security measure, the identification number can be selected according to an algorithm so that an erased or randomly altered identification number can be identified as inconsistent with the algorithm, and therefore invalid. Preferably, the algorithm is designed so that the number of valid identification numbers is a small fraction of all possible numbers having the same number of bits as the identification number. In this case, there will be a low probability that any randomly selected number will be a valid identification number.

For example, the identification number can include a certain number of bits which contain identification information, and additional error detection bits which are assigned a value calculated from the information bits. Any of the many conventional error detection algorithms would be suitable for assigning the value of the error detection bits. If the identification number stored in ID memory circuit 3 were erased or randomly altered by a thief, the identification number could be recognized as invalid by comparing the error detection bits with the value which should correspond to the information bits in accordance with the selected error detection algorithm.

A circuit 34 or computer program for testing the validity of an identification number can be included in the interrogator transceiver, described below (see FIG. 4). When an I.C. responds to an interrogator by transmitting an RF signal containing the identification number of the I.C., the interrogator can test the validity of the transmitted identification number. If the number is invalid, the interrogator can report this to the human operator as an indication that the I.C. may have been tampered with by a thief.

As an even stronger deterrent to tampering with the ID memory circuit 3, the main circuit 1 of the I.C. can include a circuit 40 for testing the validity of the identification number stored in the ID memory 3. An error handling circuit 42 within the main circuit 1 can be designed to output an error signal, or to completely disable operation of the main circuit 1, if the validation circuit 40 detects an invalid identification number in the ID memory 3. If the main circuit 1 includes a microprocessor 44, the validation and error handling circuits 40 and 42 can be a computer program stored in the microprocessor's memory circuit. (If the identification number stored in the ID memory 3 is encrypted as described below, the validation circuit 40 also must decrypt the stored ID number.)

Alternatively, a circuit for testing the validity of the identification number stored in the ID memory 3 can be included in an electrical system, such as a computer motherboard, into which the main circuit 1 is intended to be installed. The system can be designed to output an error signal, or to completely quit operating, if it detects an invalid identification number in the ID memory 3.

Validating the identification number as described above is particularly preferred if the ID memory 3 is a re-writable memory, because re-writable memory is more susceptible to tampering than permanent memory.

The identification number can be encrypted before it is stored in ID memory 3 to further deter tampering with the identification number. The encryption preferably employs a conventional public key/private key encryption algorithm, which means that the numeric key needed to encode the encrypted number (the private key) is different from the numeric key needed to decode it (the private key). The fixture at the I.C. factory which initially stores the identification number in the memory 3 would include a copy of the private key, and would use the private key to encrypt the identification number and store the encrypted number in the memory 3. The I.C. transceiver 4 would transmit the encrypted number in response to interrogation by an interrogator transceiver (described below). To decode the identification number, the interrogator transceiver would include a decryption circuit 36, or a decryption computer program, containing a stored copy of the public key.

Consequently, if a thief wanted to misrepresent the origin of an I.C. by storing a false identification number in the ID memory 3, the thief would be unable to generate a valid encrypted identification number to store in the memory 3 unless the thief had a copy of the private key. Even if the thief obtained the public key from an interrogator and an encrypted number in the memory 3, the thief would be unable to deduce the private key needed to generate a substitute encrypted number.

4. RF Transceiver in the I.C.

The RF transceiver 4 in the I.C. can be a conventional transceiver circuit having a receiver section 50 capable of receiving RF signals and detecting when a received RF signal is encoded with a predetermined interrogation message, and having a transmitter section 52 capable of transmitting an RF signal containing a response message which conveys selected information previously stored in a memory within the transceiver. In the present invention, the ID memory 3 is connected to the transmitter section of the transceiver 4, so that the information encoded in the response message includes the identification number stored in the memory 3.

The transceiver 4 can be fabricated on the same integrated circuit chip as the memory 3, or it can be fabricated in a different chip mounted in the same I.C. package 22. In applications in which the invention is employed for purposes of inventory tracking but not for theft prevention, the transceiver 4 alternatively can be fabricated as a circuit separate from, but connected to, the I.C. 10 or 20. This would be unsuitable for theft prevention, because a thief could easily disconnect the transceiver from the I.C. 10 or 20.

a. Self-Powered RF Transceiver

So that the invention can function without a battery, the RF transceiver 4 can be a conventional passive RF transponder which derives its operating power from a received electromagnetic signal. For example, U.S. Pat. No. 5,302,954 issued Apr. 12, 1994 to Brooks discloses a transponder which derives operating power from an AC magnetic field transmitted by a base station. The power is stored either in stray capacitance (FIG. 2A) or in a discrete capacitor (FIG. 2) in the transponder.

More preferably, the RF transceiver 4 is a conventional passive RF transponder which derives its operating power from RF interrogation signals transmitted by the interrogator transceiver. An example of a suitable RF transponder circuit is U.S. Pat. No. 4,857,893 issued Aug. 15, 1989 to Carroll, which discloses an RF transponder on a single monolithic I.C. chip. Its operating power is derived by rectifying the RF signals received from an interrogator unit, and storing the rectified power in distributed capacitance of the chip circuitry (column 8, lines 3–31).

U.S. Pat. No. 4,075,632 issued Feb. 21, 1978 to Baldwin et al. discloses another example of a suitable passive RF transponder whose operating power is derived by rectifying the RF signals received from an interrogator, and storing the rectified power in a discrete capacitor 91. The Baldwin transponder minimizes its power requirements by employing backscatter modulation, which means that the transponder responds to a received RF interrogation signal by modulating the received signal and reflecting it back toward the interrogator.

An additional example of a suitable passive RF transceiver design is disclosed in commonly assigned U.S. Pat. No. 5,448,110 issued Sep. 5, 1995 to Tuttle et al. Specifically relevant are the transceiver circuits 11 and 21 shown in FIGS. 1A and 1B of that patent, but modified to eliminate the battery as described in column 10, line 62—column 11, line 15.

To avoid the need for a battery, not only must the RF transceiver 4 be self-powered as just described, but the ID memory 3 also must be non-volatile as described earlier.

The entire contents of the above-mentioned U.S. Pat. Nos. 5,302,954; 4,857,893; 4,075,632; and 5,448,110 are hereby incorporated into the present application.

b. Separately Powered RF Transceiver

In the presently preferred embodiment of the invention, the ID memory 3 is volatile and hence requires battery power (or some other source of continuous electrical power) to preserve the identification number stored therein. Since a battery 24 is employed to power the memory, the battery also can be used to power the RF transceiver 4. A transceiver having a separate electrical power source, such as a battery, generally can include more sophisticated signal processing circuitry than a transceiver which derives its power from the received RF signal.

Examples of RF transceiver designs powered by a battery small enough to fit in a hybrid I.C. package 22 are described in commonly assigned U.S. Pat. No. 5,448,110 cited above, as well as in commonly assigned U.S. patent application Ser. No. 08/168,909 filed Dec. 17, 1993 U.S. Pat. No. 5,497,140 by John R. Tuttle entitled "Electrically Powered Postage Stamp or Mailing or Shipping Label Operative with RF Communication", the entire contents of which are hereby incorporated into the present application. The latter application also describes a memory circuit for storing data received and data transmitted by the transceiver. If that transceiver were used to implement the present invention, the transceiver's memory circuit would be augmented by the ID memory circuit 3 of the present invention.

If the main circuit 1, the ID number memory 3, and the RF transceiver 4 are all fabricated on a single, monolithic integrated circuit 10 as shown in FIG. 1, a battery can be employed which is small enough to mount within a standard monolithic integrated circuit package. An example of a suitable monolithic integrated circuit package including both a battery and a monolithic integrated circuit chip is described in U.S. Pat. No. 5,153,710 issued Oct. 6, 1992 to McCain, the entire contents of which are hereby incorporated into the present application. The described package has the footprint of a standard surface mount monolithic I.C. package, but is thicker than standard to accommodate the battery.

A less desirable alternative is for the transceiver 4 to be powered by a power supply or backup battery within an electronic system, such as a computer, in which the integrated circuit 10 or 20 is installed. The disadvantage of this last alternative is that it would permit identifying or tracking the integrated circuit 10 or 20 only while it is installed in a system having a power supply, whereas the preceding alternatives permit tracking the integrated circuit even when it is not installed.

In all of the preceding transceiver embodiments, the ID memory 3 preferably would be powered from the same power source as the transceiver.

5. Antenna

It is possible for the transceiver 3 to function without an antenna, because the transceiver circuit will radiate and receive RF energy to a certain extent. However, an antenna 60 is highly desirable to improve the gain of both transmitted and received RF signals, thereby extending the distance over which the transceiver can communicate.

If the integrated circuit is a monolithic I.C. 10 as shown in FIG. 1, an antenna 60 can be fabricated as part of the integrated circuit by forming a conductor on the integrated circuit in a shape suitable for functioning as an RF antenna. For example, FIG. 1 illustrates a loop antenna 40 fabricated by forming a thin conductor around the periphery of the integrated circuit 10. The antenna conductor can be formed by any conventional method of forming a conductor on an integrated circuit, such as by heavily doping the semiconductor substrate at that location, or by depositing a metal film over a dielectric layer at that location.

If the integrated circuit is a hybrid circuit 20 as shown in FIG. 2, then more space is available within the package 22 to construct an antenna 60 which is larger so as to provide more gain. Also, an array of antennas can be implemented in a hybrid circuit package so as to provide a desired directivity pattern. Examples of suitable antenna designs are described in U.S. patent application Ser. No. 08/123,030 U.S. Pat. No. 5,448,110 and application Ser. No. 08/168,909 U.S. Pat. No. 5,497,145 both cited above. Additional examples are described in commonly-assigned U.S. patent application Ser No. 08/422,007 filed Apr. 11, 1995, U.S. Pat. No. 5,572,226 entitled "Spherical Antenna Pattern(s) From Antennas Arranged in a Two-Dimensional Plane for Use in RFID Tags and Labels", the entire contents of which are incorporated into the present patent application.

If the invention is to be used solely for tracking inventory and not for security against theft, an additional alternative is to mount an antenna outside the I.C., with the antenna being connected to one or more pins of the I.C.

6. Interrogator Transceiver and Communications Protocol

Figure 4:
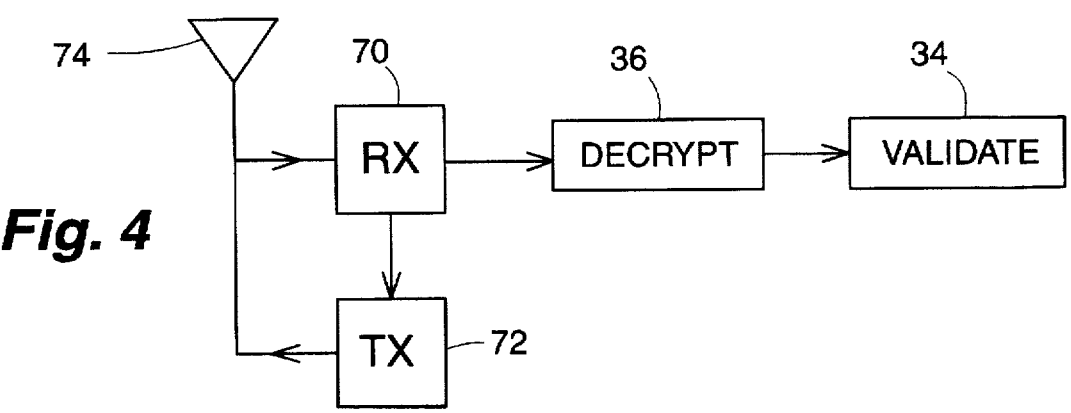
FIG. 4 is an electrical block diagram of an interrogator transceiver.

Identifying or locating an integrated circuit 10 or 20 according to the present invention requires an external interrogator transceiver, which can be any conventional RF transceiver having conventional receiver and transmitter sections 70 and 72, respectively, as shown in FIG. 4. The interrogator transceiver can occupy an enclosure of any desired size, therefore it can have a much more powerful transmitter 72 than the transceiver 4 within the integrated circuit (henceforth called the "I.C. transceiver" to distinguish it from the "interrogator transceiver").

For use by law enforcement or security personnel, the interrogator transceiver preferably is battery-powered and housed in an enclosure small enough to be portable. Also, the interrogator transceiver preferably includes a highly directional antenna 74 to provide gain so that I.C.'s can be detected over a greater distance.

A common communications protocol must be established for communications between the interrogator RF transceiver and the I.C. RF transceiver 4. Any conventional data communications or network communications protocol can be used.

When an interrogator transceiver transmits an interrogation message, the I.C. transceiver 4 within every I.C. 10 or 20 which receives the message should respond by transmitting a response message identifying itself. The communications protocol implemented in the I.C. transceivers and the interrogator transceiver may specify that the response message sent by each I.C. transceiver contains its identification number stored in its ID number memory 3. Alternatively, the protocol may specify that each I.C. transceiver initially responds to the interrogation message by transmitting a brief response message. The interrogator transceiver then could transmit another predetermined message, such as a "polling" message or a "request identification number" message, to which the I.C. transceiver would respond by transmitting its identification number stored in its ID memory 3.

Because several I.C.'s are likely to be located in close proximity, all of them will attempt to respond simultaneously upon receipt of an interrogation message from the interrogator transceiver. Simultaneous or overlapping responses, conventionally called "collisions", will be unintelligible to the interrogator transceiver. Accordingly, the communications protocol implemented in the I.C. transceivers and the interrogator transceiver preferably includes conventional collision avoidance methods. One example of a suitable collision avoidance method is the widely used Ethernet network communications protocol, which specifies that, in the event of a collision among messages sent by different transceivers, each transceiver should wait a random time period before re-sending its message.

A presently preferred collision avoidance method is the communications protocol described in commonly assigned U.S. Pat. No. 5,365,551, the entire contents of which are hereby incorporated in the present application. The respective designs of the "commander station" and the "responder station" described in that patent are suitable designs for the interrogator transceiver and the I.C. transceiver 4, respectively, in the present invention. In the protocol of the '551 patent, collisions are resolved by the interrogator transceiver, in contrast with the Ethernet protocol in which collisions are resolved by the I.C. transceivers.

In the protocol described in the '551 patent, when the interrogator transceiver receives colliding responses from different I.C. transceivers, the interrogator transceiver addresses its interrogation message to progressively smaller subsets of the I.C. transceivers until only a single I.C.

transceiver responds. The interrogator transceiver then transmits a second message requesting that single I.C. transceiver to transmit the identifying number stored in its memory 106. After receiving the identifying number from one I.C. transceiver, the interrogator then sends an interrogation message to a different subset of I.C. transceivers, repeating the process until each I.C. transceiver has identified itself. U.S. Pat. No. 5,365,551 describes the protocol in greater detail.

To help prevent the I.C. transceiver from responding to unauthorized interrogation signals, the interrogator transmitter can include a password in its interrogation messages, and each I.C. transceiver 4 can include a password verification circuit which permits the I.C. transceiver to respond to an interrogation signal only if the signal includes a proper password.

7. Method of Using the Invention

To locate suspected stolen I.C.'s, the security personnel should position the interrogator transceiver near the suspected location of the I.C.'s, point the antenna of the interrogator transceiver toward the suspected location of the I.C.'s, and operate a switch which causes the interrogator transceiver to transmit an RF signal encoded with a predetermined interrogation message. The type of encoding and the format of the message would be determined by the communications protocol implemented in the I.C. transceivers, as described below. If any I.C.'s containing the present invention receive the interrogation message, they will respond and identify themselves.

Because RF signals can penetrate non-metallic walls and travel great distances, the invention permits security personnel to locate stolen I.C.'s which otherwise would be difficult to find. Furthermore, because I.C.'s according to the present invention have an identifying number in nonvolatile memory, law enforcement personnel can trace the origin of the I.C.'s based on their identifying number, thereby proving whether they are stolen.

For use in monitoring inventories of I.C.'s, the interrogator transceiver can be portable as described above so that warehouse personnel can carry the interrogator to different locations where I.C.'s are stored. Alternatively, the interrogator transceiver can be mounted at a fixed location, and I.C.'s to be inventoried can be carried past that location by a conveyor mechanism. In either case, the interrogator transceiver would periodically transmit an RF signal containing an interrogation message to provoke each I.C. to respond with a message containing the identifying number in its ID number memory 3. To enhance the utility of the invention for inventory tracking purposes, the identifying number assigned to each I.C. during manufacture can include such information as part number and manufacture date.

The invention eliminates the need for bar code labels or other identifying labels to be attached to the I.C.'s to be inventoried. Furthermore, the invention's use of RF rather than optical communication allows the interrogator transceiver to be located a much greater distance from the I.C.'s to be inventoried, and it eliminates any need for the I.C.'s to be oriented so that a label faces a scanner.

I claim:

1. Integrated circuit apparatus incorporating an identification number, comprising:

an integrated circuit package;

a first integrated circuit mounted within the package, wherein the first integrated circuit has a primary function different from radio frequency identification; and a radio frequency identification circuit, mounted within the package, including an ID number memory integrated circuit for storing an identification number, and an integrated circuit RF transceiver including a receiver integrated circuit for receiving RF signals, and a transmitter integrated circuit for transmitting an identification RF signal conveying the stored identification number after the receiver circuit receives an RF interrogation signal.

2. Apparatus according to claim 1, wherein:

a single, monolithic, integrated circuit die mounted within the package contains said first integrated circuit, said ID memory integrated circuit, and said integrated circuit RF transceiver; and the package is a monolithic integrated circuit package.

3. Apparatus according to claim 1, wherein the package is a hybrid integrated circuit package.

4. Integrated circuit apparatus incorporating an identification number, comprising:

an integrated circuit package;

a first integrated circuit mounted within the package;

a re-writable memory integrated circuit for storing an identification number, including a write enable input to which an electrical signal must be applied in order to re-write the number stored in the memory with a specific new value; and an integrated circuit RF transceiver, mounted within the package, including a receiver integrated circuit for receiving RF signals, and a transmitter integrated circuit for transmitting an identification RF signal conveying the stored identification number after the receiver circuit receives an RF interrogation signal;

wherein the integrated circuit package completely encapsulates the memory circuit so that the write enable input is not connected to any electrical contact external to the package.

5. Integrated circuit apparatus incorporating an identification number, comprising:

an integrated circuit package;

a first integrated circuit mounted within the package;

a memory integrated circuit, mounted within the package, for storing an identification number;

means for storing in the memory an identification number which has a value which is one of a limited number of values which are valid according to a predetermined algorithm; and an integrated circuit RF transceiver, mounted within the package, including a receiver integrated circuit for receiving RF signals, and a transmitter integrated circuit for transmitting an identification RF signal conveying the stored identification number after the receiver circuit receives an RF interrogation signal.

6. Integrated circuit apparatus incorporating an identification number, comprising:

an integrated circuit package;

a first integrated circuit mounted within the package;

a memory integrated circuit, mounted within the package, for storing an identification number;

an integrated circuit RF transceiver, mounted within the package, including a receiver integrated circuit for receiving RF signals, and a transmitter integrated circuit for transmitting an identification RF signal conveying the stored identification number after the receiver circuit receives an RF interrogation signal and a circuit for testing whether the identification number stored in the ID memory has a value which is one of a limited number of values which are valid according to a predetermined algorithm.

7. Apparatus according to claim 6, wherein the testing circuit further includes a circuit for disabling one or more operations of the first integrated circuit if the testing circuit indicates the stored identification number is invalid.

8. Apparatus for identifying a first integrated circuit, comprising:

an integrated circuit package;

a first integrated circuit mounted within the package;

an ID number memory integrated circuit, mounted within the package, for storing an identification number, wherein the identification number stored in the ID memory has a value which is one of a limited number of values which are valid according to a predetermined algorithm;

an integrated circuit RF transceiver, mounted within the package, including a receiver integrated circuit for receiving RF signals, and a transmitter integrated circuit for transmitting an identification RF signal conveying the stored identification number after the receiver circuit receives an RF interrogation signal; and an interrogator RF transceiver, physically separate from and physically unattached to the integrated circuit package, including an interrogator RF transmitter circuit for transmitting said RF interrogation signals, and an interrogator RF receiver circuit for receiving said identification RF signals from the integrated circuit RF transceiver and for detecting whether the identification number conveyed in each identification RF signal has a valid value.

9. Apparatus according to claim 1, wherein:

the first integrated circuit is fabricated on a first integrated circuit substrate area; and the radio frequency identification circuit is fabricated on a second integrated circuit substrate area;

wherein the first area is substantially greater than the second area.

10. Apparatus according to claim 5, wherein:

the identification number occupies a predetermined number of bits in the memory; and the algorithm recognizes as valid identification numbers only a small fraction of all possible numbers having said predetermined number of bits.

11. Apparatus according to claim 6, wherein the first integrated circuit includes the testing circuit.

12. Apparatus according to claim 6, further comprising:

a second circuit located outside the integrated circuit package;

wherein the second circuit is connected to the first integrated circuit; and wherein the second circuit includes the testing circuit.

13. Apparatus according to claim 12, wherein:

the first integrated circuit is a microprocessor; and the second circuit is a computer motherboard on which the integrated circuit package is mounted.

14. Integrated circuit apparatus incorporating an identification number, comprising:

an integrated circuit package;

a first integrated circuit mounted within the package;

a memory integrated circuit for storing an identification number;

an integrated circuit RF transceiver, mounted within the package, including a receiver integrated circuit for receiving RF signals, and a transmitter integrated circuit for transmitting an identification RF signal conveying the stored identification number after the receiver circuit receives an RF interrogation signal; and a battery, connected to the memory circuit, which is mounted to the integrated circuit package in such a way that the battery cannot be disconnected from the memory circuit without physically defacing the integrated circuit package.

15. A method of identifying an integrated circuit, comprising the steps of:

providing an integrated circuit package;

mounting within the package a first integrated circuit which performs a primary function different from radio frequency identification;

mounting within the package a radio frequency identification circuit which includes a memory integrated circuit and an RF transceiver integrated circuit;

storing an identification number in the memory;

the RF transceiver receiving RF signals; and upon receiving an RF interrogation signal, the RF transceiver transmitting an identification RF signal conveying the identification number stored in the memory.

16. A method according to claim 15, further comprising the steps of:

fabricating the first integrated circuit on a first integrated circuit substrate area; and fabricating the radio frequency identification circuit on a second integrated circuit substrate area;

wherein the first area is substantially greater than the second area.

17. A method according to claim 15, further comprising the step of:

fabricating both the first integrated circuit and the radio frequency identification circuit on a single, monolithic, integrated circuit substrate;

wherein the step of providing an integrated circuit package comprises providing a monolithic integrated circuit package.

18. A method according to claim 17, wherein the fabricating step comprises fabricating the first integrated circuit on a first area of the single substrate; and fabricating the radio frequency identification circuit on a second area of the single substrate;

wherein the first area is substantially greater than the second area.

19. A method of identifying an integrated circuit, comprising the steps of:

providing an integrated circuit package;

mounting within the package a first integrated circuit;

mounting within the package an RF transceiver integrated circuit;

mounting within the package a re-writable memory integrated circuit for storing an identification number, wherein the memory circuit includes a write enable input to which an electrical signal must be applied in order to re-write the number stored in the memory with a specific new value;

encapsulating the memory circuit within the package so that the write enable input is not connected to any electrical contact external to the package;

the RF transceiver receiving RF signals; and upon receiving an RF interrogation signal, the RF transceiver transmitting an identification RF signal conveying the identification number stored in the memory.

20. A method of identifying an integrated circuit, comprising the steps of:

providing an integrated circuit package;

mounting within the package a first integrated circuit;

mounting within the package an RF transceiver integrated circuit;

mounting within the package a memory integrated circuit;

storing in the memory an identification number having a value which is one of a limited number of values which are valid according to a predetermined algorithm;

the RF transceiver receiving RF signals; and upon receiving an RF interrogation signal, the RF transceiver transmitting an identification RF signal conveying the identification number stored in the memory.

21. A method according to claim 20, wherein the storing step comprises:

storing in the memory the identification number having a predetermined number of bits;

wherein the algorithm recognizes as valid identification numbers only a small fraction of all possible numbers having said predetermined number of bits.

22. A method of identifying an integrated circuit, comprising the steps of:

providing an integrated circuit package;

mounting within the package a first integrated circuit;

mounting within the package an RF transceiver integrated circuit;

mounting within the package a memory integrated circuit;

storing in the memory an identification number;

the RF transceiver receiving RF signals;

upon receiving an RF interrogation signal, the RF transceiver transmitting an identification RF signal conveying the identification number stored in the memory; and testing whether the identification number stored in the memory has a value which is one of a limited number of values which are valid according to a predetermined algorithm.

23. A method according to claim 22, further comprising the step of:

disabling one or more operations of the first integrated circuit if the testing step determines that the stored identification number has an invalid value.

24. A method according to claim 22, further comprising the steps of:

providing an interrogator RF transceiver which is physically separate from and physically unattached to the integrated circuit package;

the interrogator transceiver transmitting said RF interrogation signal; and the interrogator transceiver receiving said identification RF signal from the integrated circuit RF transceiver;

wherein the step of testing whether the identification number stored in the memory has a valid value includes the interrogator transceiver testing whether the identification number conveyed in the received identification RF signal has a valid value.

* * * * *